United States Patent [19]

Hoffmann

[11] Patent Number: 4,860,320
[45] Date of Patent: Aug. 22, 1989

[54] METHOD FOR RECOVERING A CONTROL SIGNAL FOR CONTROLLING THE PHASE OF A LOCAL CARRIER SIGNAL

[75] Inventor: Michael Hoffmann, Backnang, Fed. Rep. of Germany

[73] Assignee: ANT Nachrichtentechnik GmbH, Backnang, Fed. Rep. of Germany

[21] Appl. No.: 287,052

[22] Filed: Dec. 21, 1988

Related U.S. Application Data

[63] Continuation-in-part of Ser. No. 62,366, Jun. 12, 1987, Pat. No. 4,811,363, and a continuation-in-part of Ser. No. 165,715, Mar. 8, 1988.

[30] Foreign Application Priority Data

Jan. 23, 1988 [EP] European Pat. Off. .......... EP88 100 983.1

[51] Int. Cl.⁴ .............................................. H03D 3/02
[52] U.S. Cl. .................................... 375/83; 375/120; 375/97; 329/124
[58] Field of Search ............... 375/97, 83, 120, 39, 375/102; 329/112, 122, 124

[56] References Cited

U.S. PATENT DOCUMENTS

| 3,970,946 | 7/1976 | Matsuo . | |
|---|---|---|---|
| 4,084,137 | 4/1978 | Welti | 375/38 |
| 4,404,532 | 9/1983 | Welti | 375/86 |
| 4,546,322 | 10/1985 | Crutcher | 375/83 |
| 4,646,326 | 2/1987 | Backof, Jr. et al. | 375/39 |
| 4,687,999 | 8/1987 | Desperben et al. | 375/39 |

OTHER PUBLICATIONS

M. Hoffman, "Carrier Recovery for M-QAM-Signals," published in proceedings of the European Conference of Radio Relay Systems (Nov., 1986), pp. 247-253.

Y. Matsuo et al., "Carrier Recovery Systems for Arbitrarily Mapped APK Signals," published in IEEE Transactions on Communications, vol. Com-30, No. 10, (Oct., 1982), pp. 2385-2390.

Primary Examiner—Robert L. Griffin
Assistant Examiner—Marianne Huseman
Attorney, Agent, or Firm—Spencer & Frank

[57] ABSTRACT

Reliable phase synchronicity between a local carrier signal and the carrier signal of an amplitude and/or phase shift keyed received signal is produced as quickly as possible by employing a phase detector characteristic whose root means square outside of the synchronization point is as large as possible and whose synchronization point, i.e., zero passage, is situated such that it also considers a phase deviation of the received signal component from its quadrature position.

4 Claims, 12 Drawing Sheets

1

METHOD FOR RECOVERING A CONTROL SIGNAL FOR CONTROLLING THE PHASE OF A LOCAL CARRIER SIGNAL

CROSS REFERENCES TO RELATED APPLICATION

This is a continuation-in-part of my co-pending application Ser. No. 07/062,366, filed June 12th, 1987, now U.S. Pat. No. 4,811,363 and my co-pending application Ser. No. 07/165,715, filed Mar. 8th, 1988, the disclosures of these co-pending applications being incorporated herein by reference.

BACKGROUND OF THE INVENTION

The present invention is directed to a method for recovering a signal to control the phase of a local carrier signal in such a manner that the local carrier signal and the carrier signal of an amplitude and/or phase shift keyed received signal are in phase synchronism. More particularly, the present invention is directed to a control signal recovery method of the type which includes the steps of dividing the local carrier signal into two at least approximately orthogonally oriented local carrier components which represent the axes of a signal state plane having four quadrants; mixing the received signal with the two local carrier signal components to produce two mixed signals which represent projections of received signal states on the coordinate axes of the signal state plane; using the two mixed signal components to address a memory having a plurality of memory locations in order to read out the content of a memory location for each received signal state, the memory locations corresponding to quantized regions into which the signal state plane is divided by way of quantization thresholds extending parallel to the two coordinate axes, predetermined ones of the quantization thresholds intersecting at predetermined points which correspond to permitted signal states that might have been transmitted, each memory location storing a numerical value which is representative of a phase deviation between a corresponding quantized region and the closest predetermined point; and averaging numerical values read out of the memory for a plurality of received signal states to produce the control signal.

Such a method is disclosed in an article by M. Hoffmann, entitled "Carrier Recovery for a m-QAM Signals" in the proceedings of the European Conference of Radio Relay Systems (ECRR), pages 247-253, published by vde-verlag, Munich, November, 1986. This method is used to obtain a control signal for a voltage controlled oscillator used to recover the carrier in a demodulator circuit for amplitude and/or phase shift keyed QASK signals.

SUMMARY OF THE INVENTION

It is an object of the invention to provide a method of the above-mentioned type which permits reliable and quick carrier regeneration in a receiver for amplitude and/or phase shift keyed signals while simultaneously minimizing phase deviations in the signal components from the quadrature position.

In accordance with one aspect of the invention this object can be attained, in a control signal recovery method of the type described above, by providing that the numerical values f(x, y) associated with the individual quantized regions in all four quadrants of the signal state plane and stored in the respective memory locations are selected in such a manner that $$f(-x, y) = -f(x, y) \text{ and}$$

$$f(x, -y) = -f(x, y),$$

where x and y represent the position coordinates of the quantized regions within the signal state plane;
the quantized regions disposed in the close vicinity of the desired signal states have such associated numerical values that the numerical values of quantized regions lying next to one another in the direction of one of the two coordinate axes have opposite signs and the numerical values of quantized regions lying next to one another in the direction of the other coordinate axis have the same signs; and
all other quantized regions within each quadrant are associated with such numerical values f(x, y) for which $$f(x, y) = -f(\text{sign}(y)\cdot|y|, \text{sign}(y)\cdot|x|).$$

The method of the invention meets the requirement for fast phase synchronization of the local oscillator in the receiver with the phase of the received signal and it also counteracts faulty synchronization which may occur, for example, due to a phase deviation of the signal components of a received signal from their quadrature position.

DESCRIPTION OF THE PREFERRED EMBODIMENTS

Figure 1:
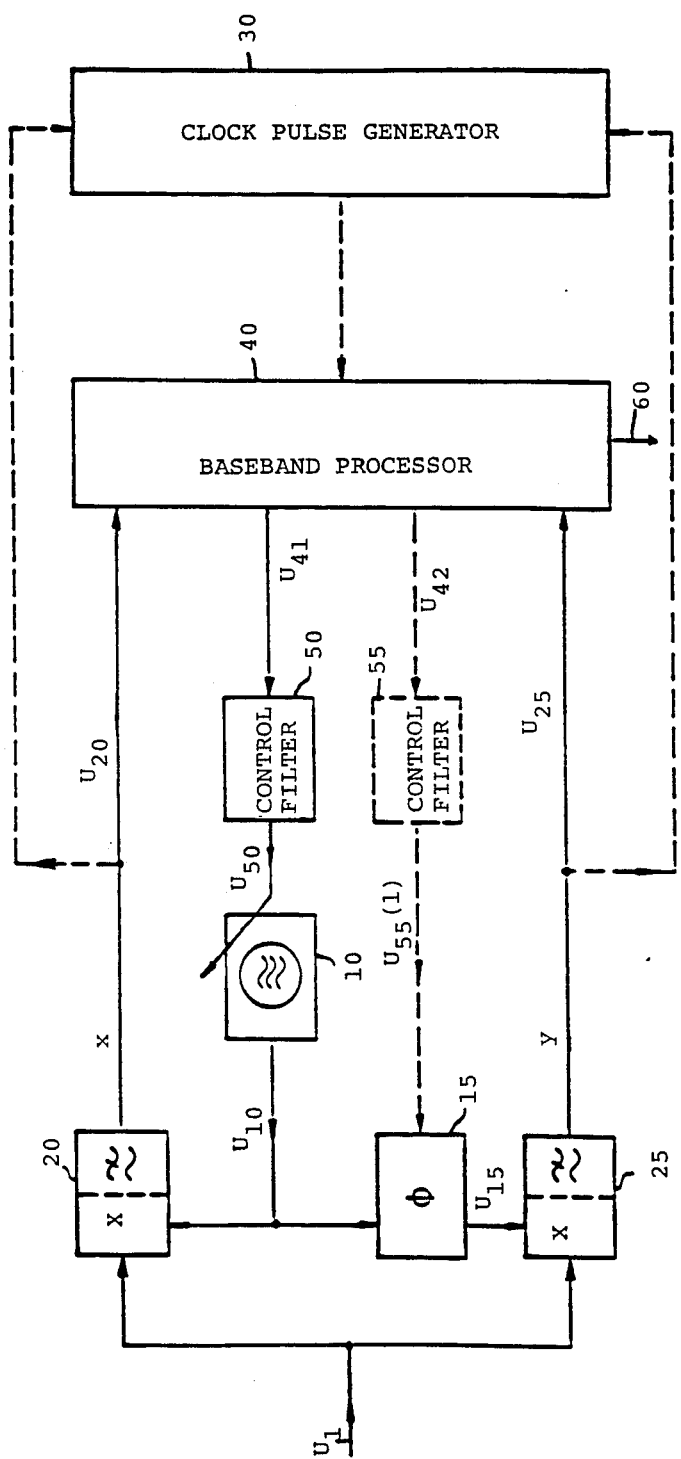
FIG. 1 is a block circuit diagram of a QASK receiver.

Communication methods for the transmission of information by means of amplitude and/or phase shift keyed signals, abbreviated as QASK (Quadrature Amplitude Shift Keying) signals, have gained in significance in recent years. QASK signals can be described as follows:

$$u_1(t) = u_1 \sum_k G(t - kT) \cdot \{a_k \cos(\omega t + \phi) + b_k \sin(\omega t + \phi)\} \quad (1)$$

where
where $$u_N(t) = \cos(\omega t + \phi) \quad (2)$$

is the normal or inphase component and $$u_Q(t) = \sin(\omega t + \phi) \quad (3)$$

is the quadrature component of the signal carrier, and where G(t) is a function meeting the following condition:

$$G(t) = \begin{cases} 1 \text{ for } t = 0 \\ 0 \text{ for } t = nT, n \text{ is a whole number}, n \neq 0 \end{cases} \quad (4)$$

The value pairs ($a_k$, $b_k$) contain the time-and-value discrete information to be transmitted at times $t = kT$ (where T is the time allotted for transmitting one symbol, in the form of a value pair). With a given m-level transmission method (i.e., one of m symbols can be transmitted during each period T), the value pairs must take on only m different value combinations. The m-level quadrature amplitude modulation methods (QAM methods) are of special significance. Other QASK modulation methods are known in the technical literature. The statements below apply to all QASK methods but will be described with reference to a QAM method.

The prior art block circuit diagram shown in FIG. 1 represents the circuit principle of a quadrature receiver as described, for example, in the aforesaid article by M. Hoffmann, entitled "Carrier Recovery for m-QAM signals," in ECRR, pages 247-253, published by vde-verlag, Munich, November, 1986. In FIG. 1 solid lines are used to illustrate essential circuitry for regenerating the carrier of the received input signal $u_1(t)$; the dotted-line connections, however, are also preferably present in the circuit.

The receiver of FIG. 1 is suitable for demodulating QASK signals. A voltage controlled oscillator (VCO) 10 serves the purpose of generating a signal $$u_{10}(t) = \hat{u}_{10} \cdot \cos(\omega t + \phi + \psi) \quad (5)$$

which is in a rigid phase relationship to the carrier of the input signal $u_1(t)$.

The phase $\psi$ is dependent on the VCO control signal $u_{50}$ from a control filter 50. From signal $u_{10}(t)$, a phase shifter 15 forms the 90° phase shifted signal $$u_{15}(t) = \hat{u}_{10} \cdot \sin(\omega t + \phi + \psi) \quad (6)$$

From input signal $u_1(t)$ and from signals $u_{10}(t)$ and $u_{15}(t)$, respectively, down converters 20 and 25 produce the signals $$u_{20}(t) = A \sum_k G(t - kT) \cdot \{a_k \cos(\psi) - b_k \sin(\psi)\} \quad (7)$$

$$u_{25}(t) = A \sum_k G(t - kT) \cdot \{a_k \sin(\psi) + b_k \cos(\psi)\} \quad (8)$$

The information contained in $u_{20}(t)$ and $u_{25}(t)$ regarding the clock pulse frequency 1/T (i.e., the symbol transmission rate) can be utilized in a clock pulse regenerator 30 to regenerate a clock pulse signal having the correct phase. An embodiment of a clock pulse regenerator is disclosed, for example, in an article by Tho Le-Ngoc and Kamilo Feher, entitled "Digital Approach to Symbol Timing Recovery Systems", in IEEE Trans. Com., Vol. COM-28, No. 12, December 1980, pages 1933-1999.

The regenerated clock pulse signal is utilized to sample signals $u_{20}(t)$ and $u_{25}(t)$ at times $t = kT$. This task is performed, in addition to others, in a so-called baseband processor 40 (which may also be called a phase detector). The following applies for the two signal components x and y, which are in phase quadrature to one another:

$$x = u_{20}(kT) = A \cdot \{a_k \cos(\psi) - b_k \sin(\psi)\} \quad (9)$$

$$y = u_{25}(kT) = A \cdot \{a_k \sin(\psi) + b_k \cos(\psi)\} \quad (10)$$

For $\psi = 0$, the two signal components x and y represent the demodulated information $a_k$, $b_k$. A significant task of the demodulator circuit is thus to regulate the phase to $\psi = 0$. Since at $\psi = 0$ the locally generated signal $u_{10}(t)$ is identical with one carrier component of input signal $u_1(t)$ except for an amplitude factor, the signal $u_{10}(t)$ is the locally regenerated carrier signal.

Output signal $u_{41}(t)$ from baseband processor 40, to be described in greater detail below, is a function of the phase difference between the carrier of the received input signal $u_1(t)$ and the local carrier signal $u_{10}(t)$ generated by voltage controlled oscillator 10. The signal $u_{41}(t)$ is filtered by a control filter 50 in the circuit of FIG. 1. The output signal $u_{50}(t)$ of this filter represents the average value of $u_{41}$ over a period of time and provides the control signal for voltage controlled oscillator (VCO) 10.

Down converters 20 and 25, baseband processor 40, control filter 50, VCO 10, and phase shifter 15 of FIG. 1 form a control loop for the local regeneration of the carrier of input signal $u_1(t)$. At the same time, blocks 20, 25, 20 and 15 form the quadrature receiver.

For correct demodulation (the demodulated output is illustrated at 60 in FIG. 1), it is important that the carrier components employed at the transmitter are perpendicular to one another and also that the locally regenerated carrier components $u_{10}(t)$ and $u_{15}(t)$ are mutually shifted in phase by 90°. However, in practice there may exist slight deviations from the 90° phase difference. Then, instead of Equations (2), (3), (5), and (6), the following applies:

$$u_N(t) = \cos(\omega t + \phi) \quad (11)$$

$$u_Q(t) = \sin(\omega t + \phi + \epsilon) \quad (12)$$

$$u_{10}(t) = u_{10} \cdot \cos(\omega t + \phi + \psi) \quad (13)$$

$$u_{15}(t) = u_{10} \cdot \sin(\omega t + \phi + \psi + \delta) \quad (14)$$

where $\epsilon$ is a slight phase deviation of the transmitter carrier component from the quadrature position and $\delta$ is a corresponding deviation in the receiver. Consequently, the signal components according to Equations (9) and (10) are changed to $$x = A \cdot \{a_k \cos(\psi) - b_k \sin(\psi - \epsilon)\} \quad (15)$$

$$y = A \cdot \{a_k \sin(\psi + \delta) + b_k \cos(\psi + \delta - \epsilon)\} \quad (16)$$

From these equations it follows that, for optimum demodulation, measures must be taken which compensate the influence of phase deviations $\epsilon$ and $\delta$. In addition to the carrier regeneration loop which regulates the phase difference $\psi$ to a constant value ($\psi = \epsilon$), a second control loop is thus also available to influence the phase deviation $\delta$ so that $\delta = -4$. In this case x depends only of $a_k$ and y depends only of $b_k$.

For this purpose, phase shifter 15 in the circuit of FIG. 1 may be constructed so that fine tuning of the phase shift becomes possible by way of a control signal. The additional control information $u_{42}(t)$ required to do this can also be obtained in baseband processor 40.

In the block circuit diagram of FIG. 1, the control signal $u_{42}(t)$, which is a function of the phase deviation $\delta$ and is determined in a similar manner as signal $u_{41}(t)$, is switched to a control filter 55 whose output signal $u_{55}(t)$ is fed to the control input of phase shifter 15.

Down converters 20 and 25, baseband processor 40, control filter 55, local oscillator 10, and phase shifter 15 form the control loop to bring phase difference $\delta$ to a constant value.

Output signals $u_{41}(t)$ and $u_{42}(t)$, respectively, of baseband processor 40, as mentioned above, are functions of phase differences. Therefore, these output signals are also called phase detector functions. The previously-mentioned article by A. Leclert and P. Vandamme, entitled "Universal Carrier Recovery Loop for QASK and PSK Signal Sets," in IEEE Transactions on Communications, Volume COM-31, No. 1, January, 1983, pages 130–136, and the previously-mentioned article by M. Hoffmann, entitled "Carrier Recovery for m-QAM Signals" in ECRR, pages 247–253, published by vde-verlag, Munich, November, 1986, describe several phase detector functions. One possible phase detector function, for example, is $$u_{41}(t) = -\text{sign}(x - \hat{x}) \cdot \text{sign}(y) \quad (17)$$

which is easily accessible for digital signal processing. Here, x and y are the signal components of a received signal state which, in Equations (15) and (16), are functions of time and the phase differences $\psi$, $\delta$, and $\epsilon$, and sign ( . . . ) is the signum function known from mathematics. The signum function is defined such that sign (a)=1 if a >0, sign (a)=0 if a=0, and sign (a)=-1 if a <0. Signal components x and y can be imagined as projections on the coordinate axes of a signal state plane, with the coordinate axes dividing the entire signal state plane into four regions or quadrants. By means of quantization thresholds extending parallel to both coordinate axes, the signal state plane can be divided into a plurality of quantized regions. The grid of quantization thresholds can be arranged in such a way that the permitted signal states lie on the points of intersection of quantization thresholds. The individual quantized regions can have associated numerical values which are representative of the phase deviation of the respective quantized region from the desired signal state closest to it. The numerical value of each quantized region is derived from a phase detector function, for example according to Equation (17). In Equation (17), $\hat{x}$ represents the signal component $a_k$ and $b_k$, respectively, of that permitted signal state which comes closest to the received signal state having the signal component x. The quantization thresholds can be achieved with the aid of analog-to-digital converters that supply address signals for a memory which associates the numerical values with respective quantized regions, as will be explained in more detail with reference to FIG. 12.

Figure 12:
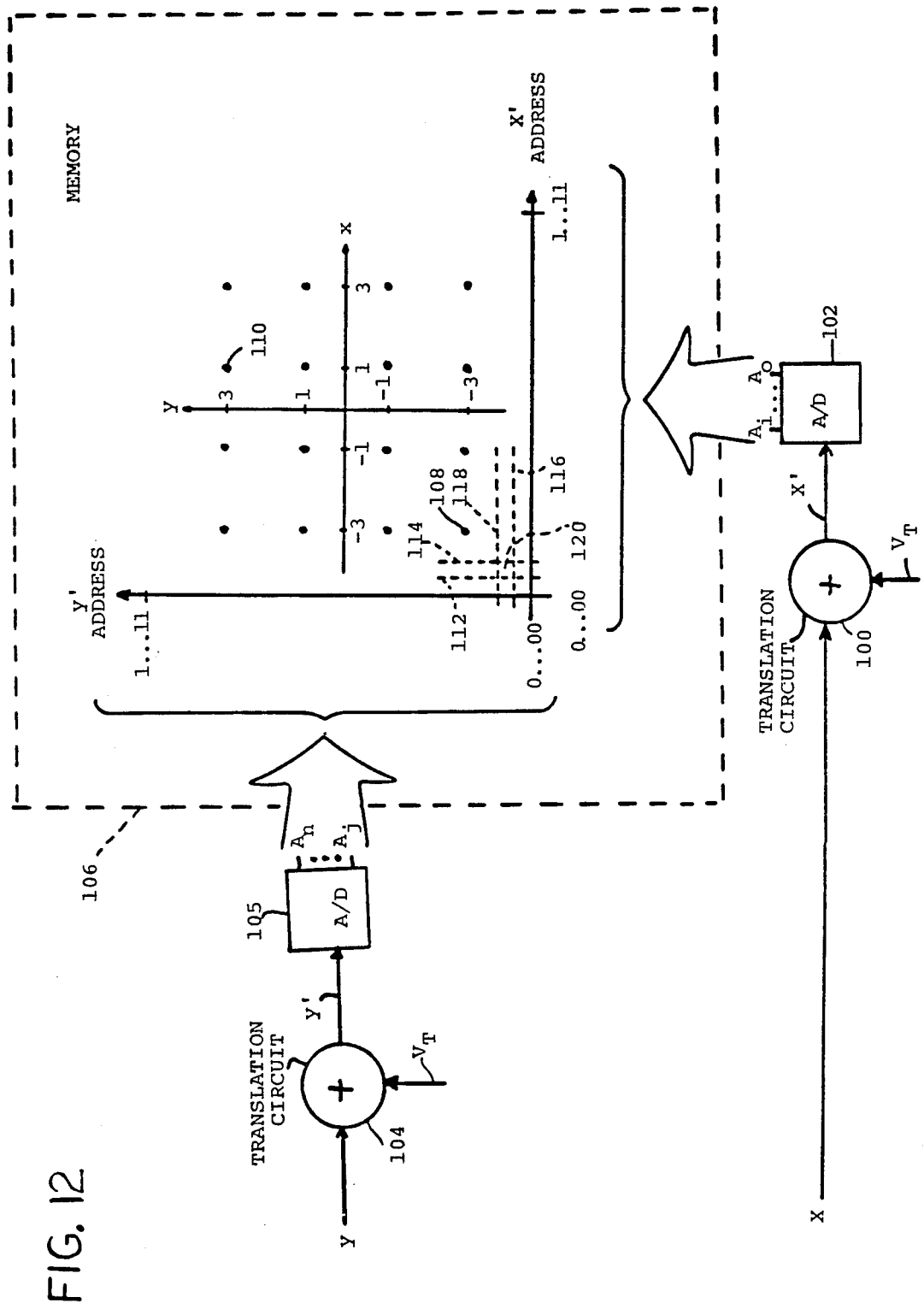
FIG. 12 is a block diagram employed to explain how a memory and A/D converters can be used to establish quantization thresholds and quantization regions.

FIG. 12 illustrates a portion of a baseband processor which receives an x signal component from converter 20 (FIG. 1) and a y signal component from converter 25 (also in FIG. 1). Translation circuit 100, such as an analog summing circuit, increases the x signal component by a predetermined translation voltage $v_T$. The translation voltage $v_T$ is selected to that the lowest value of the signal component x that might be encountered in practice will nevertheless result in a positive value x' as the output of translation circuit 100. The translated signal component x' is applied as an input signal to an analog-to-digital converter 102. In a similar manner, translation circuit 104 increases the signal component y by a predetermined value $v_T$ so as to provide a translated signal y' which is never negative. The translated signal y' is applied as an input to analog-to-digital converter 105. A memory IC such as ROM 106 has address input pins (not specifically shown ) $A_0$, $A_1$, . . . , $A_i$, $A_j$, . . . , $A_n$. The output of analog-to-digital converter 102 supplies address signals for the pins $A_o$ through $A_i$, and the output of analog-to-digital converter 104 supplies the address signals for pins $A_j$ through $A_n$. As a result, the storage space of memory 106 can be considered as an x'-y' plane. It will be understood that A/D-converters with an in-built translation circuit don't need further external translation circuits to provide address signals $A_o$, . . . , $A_{i-j}$ or $A_i$, . . . $A_n$.

In FIG. 12, the x-y signal state plane for a 16-QASK system is illustrated in its translated position with respect to the x'-y' plane. The values of $A_k$ and $B_k$ for a 16-QAM system are indicated in the following table:

TABLE

| $a_k$ | $b_k$ | $a_k$ | $b_k$ |
| --- | --- | --- | --- |
| +1 | +1 | −1 | −1 |
| +1 | +3 | −1 | −3 |
| +3 | +1 | −3 | −1 |
| +3 | +3 | −3 | −3 |
| −1 | +1 | +1 | −1 |
| −1 | +3 | +1 | −3 |
| −3 | +1 | +3 | −1 |
| −3 | +3 | +3 | −3 |

These values of $a_k$ and $b_k$ are marked by the 16 dots 108, 110, and so forth in FIG. 12.

It will be appreciated that the input signal x' to converter 102 is an analog signal, while the output is digital. This means that when the input signal x' is exactly zero, the value $A_o$, . . . , $A_i$ supplied by converter 102 as the x' address for memory 106 is a binary number having all zeroes. As x' increases incrementally, the address remains unchanged until x' exceeds a predetermined value and the output of converter 102 changes from 0 . . . 00 to 0 . . . 01. This changes corresponds to quantization threshold 112. After a further incremental increase in the value of x', the value of the x' address supplied by converter 102 changes to 0 ... 10, which corresponds to the quantization threshold 114. Although not illustrated, it will be apparent that a large number of further quantization thresholds could be drawn to represent the remaining digital states of the output of converter 102. In a similar manner, the output of converter 105 provides quantization thresholds 116, 118, and so forth. It will be noted that quantization thresholds 116, 118 and so forth are parallel to the x and x' axes while quantization thresholds 112, 114, and so forth are parallel to the y and y' axes.

With continuing reference to FIG. 12, quantization region 120 corresponds to a memory location in memory 106 and is bounded by quantization thresholds 112-118. There are of course many further quantization regions in memory 106 although they are not illustrated in FIG. 12. Memory 106 selects quantization region 120—or rather a memory location corresponding to quantization region 120—when the analog signal x' has a value greater than that established by quantization threshold 112 but less than the value established by quantization threshold 114, and when the analog signal y' has a value greater than that established by quantization threshold 116 but less than the value established by quantization threshold 118. When this occurs, the content of the memory location corresponding to quantization region 120 is read out of memory 106. As was noted previously, in the present invention a numerical value derived from a phase detector function would be stored in this memory location. If the phase detector function employed were equation (17), for example, the value −1 would be stored in the memory location corresponding to quantized region 120. This value is obtained by noting that the signal component $a_k = -3$, $b_k = -3$ (that is, point 108) is the closest desired signal state to quantized region 120, and thus provides a value of −3 for x for equation (17). While the x and y values of equation (17) refer to the actual analog x and y signals, since the quantization thresholds in memory 106 are very close together it is sufficient, for practical purposes, to identify these values with reference to the x-y signal state plane in FIG. 12. That is, quantized region 120 is designated when the signal component x input to translation circuit 100 is about $-3\frac{1}{2}$ volts and when the signal component y input to translation circuit 104 is about $-3\frac{1}{2}$ volts, and this corresponds to the position of quantized region 120 in the x-y plane of FIG. 12 (bearing in mind that quantization thresholds 112-118 and thus quantized region 120 are shown on a greatly enlarged scale in FIG. 12 for purposes of illustration.

Figure 2:
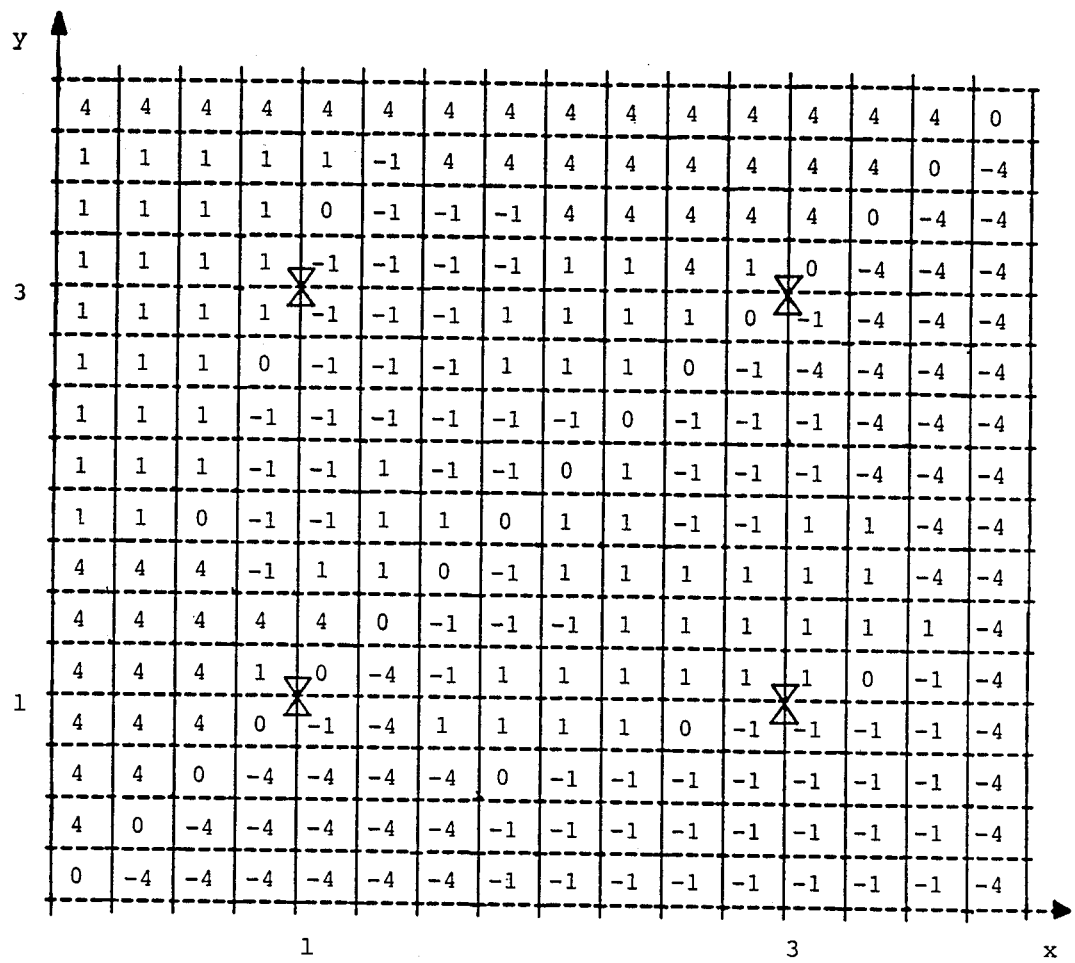
FIG. 2 is a first quantization diagram for a 16 QAM system.
Figure 3:
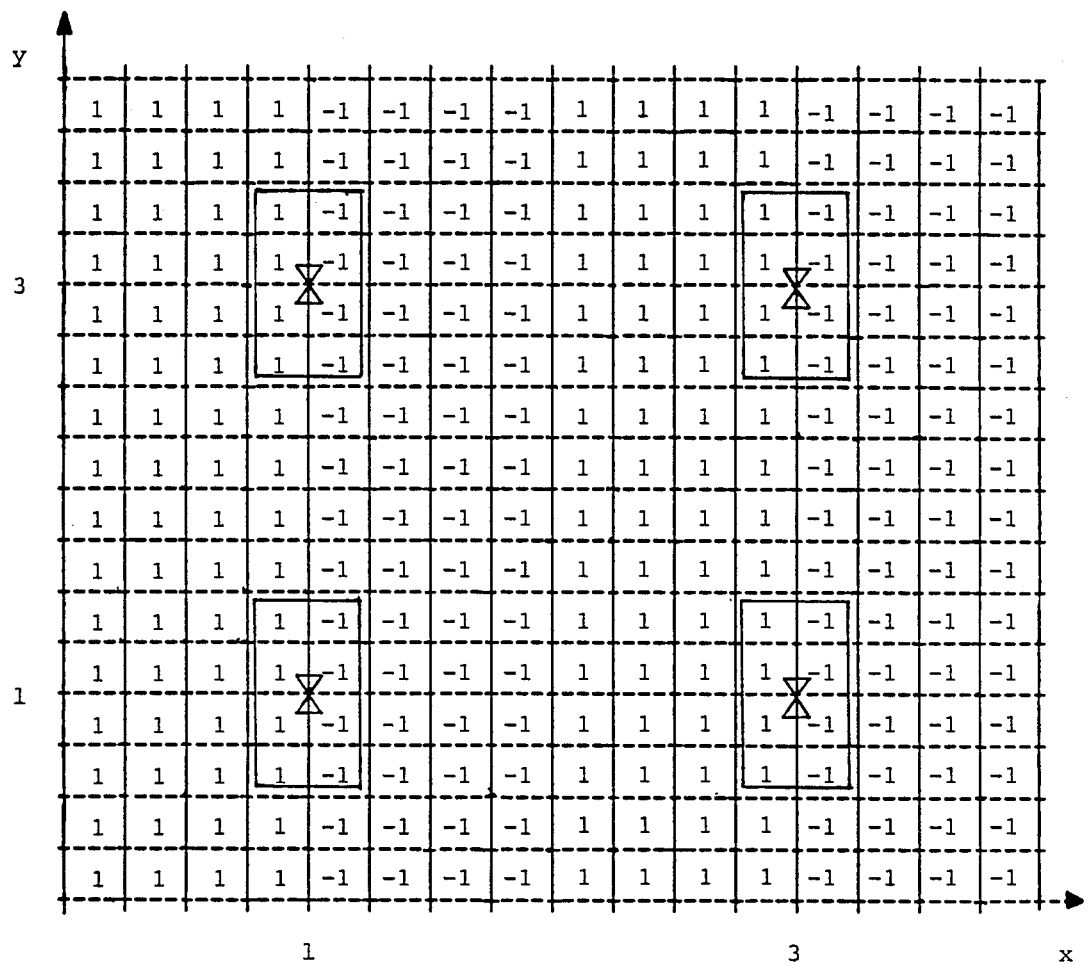
FIG. 3 is a second quantization diagram for a 16 QAM system.
Figure 8:
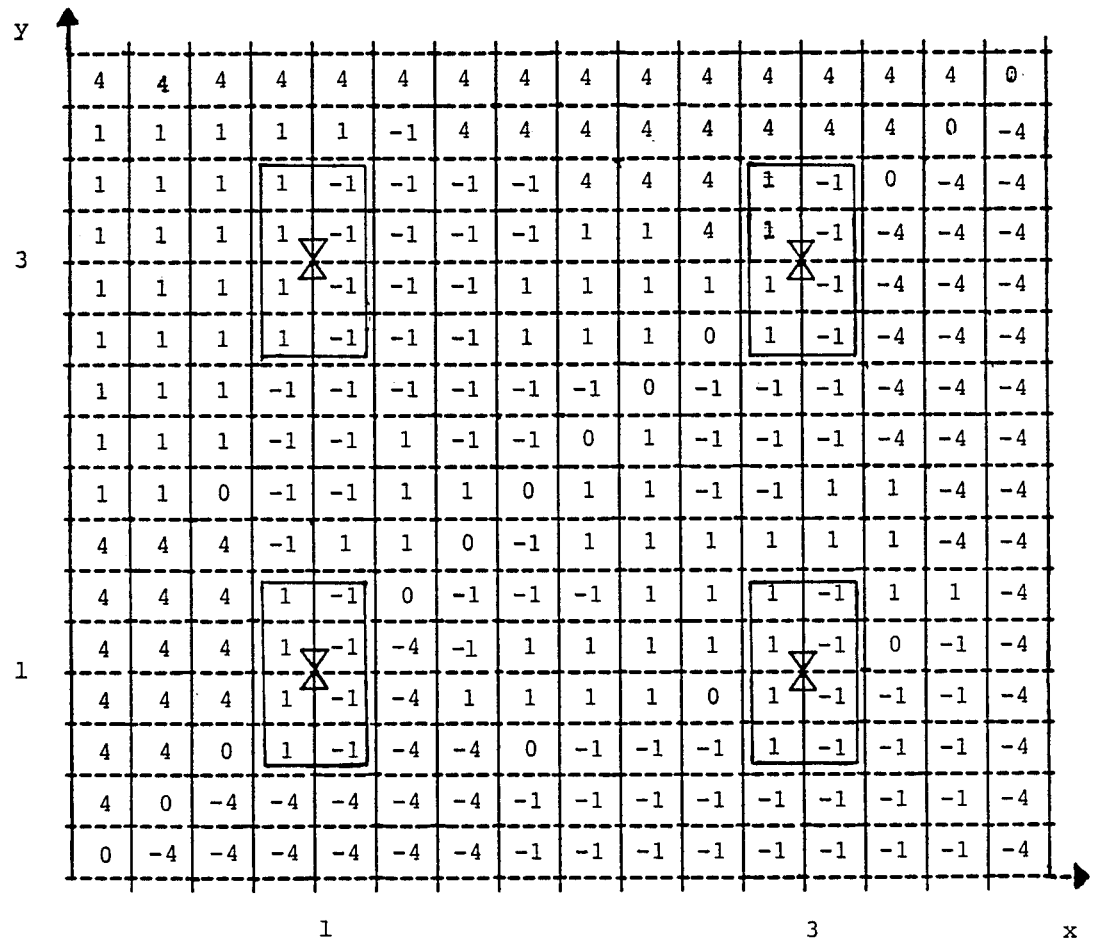
FIG. 8 is a third quantization diagram resulting from the first and second quantization diagrams (FIGS. 2 and 3).

FIGS. 2, 3, and 8 each show one quadrant of a signal state plane in which the permitted desired signal states are marked by X's. These Figures also show examples of numerical values which are associated with each individual quantized region and which are representative of the phase deviation of the respective quantized region from the permitted signal state closest to it.

With references to FIGS. 2 and 3, two signal state planes for a 16 QAM system are illustrated but the numerical values associated with the quantized regions for each signal state plane result from different phase detector functions. The numerical values in FIG. 3 were determined with the use of Equation (17). The numerical values f(x, y) in the quantized regions of the other three quadrants can be derived from the numerical values of the one quadrant shown in FIGS. 2 and 3 by meeting the following conditions:

$$f(-x, y) = -f(x, y)$$

and $$f(x, -y) = -f(x, y) \tag{18}$$

At this point a brief digression is appropriate to explain how the actual control signal for voltage controlled oscillator 10 is formed with the aid of numerical tables as given in FIGS. 2 and 3.

Figure 13:
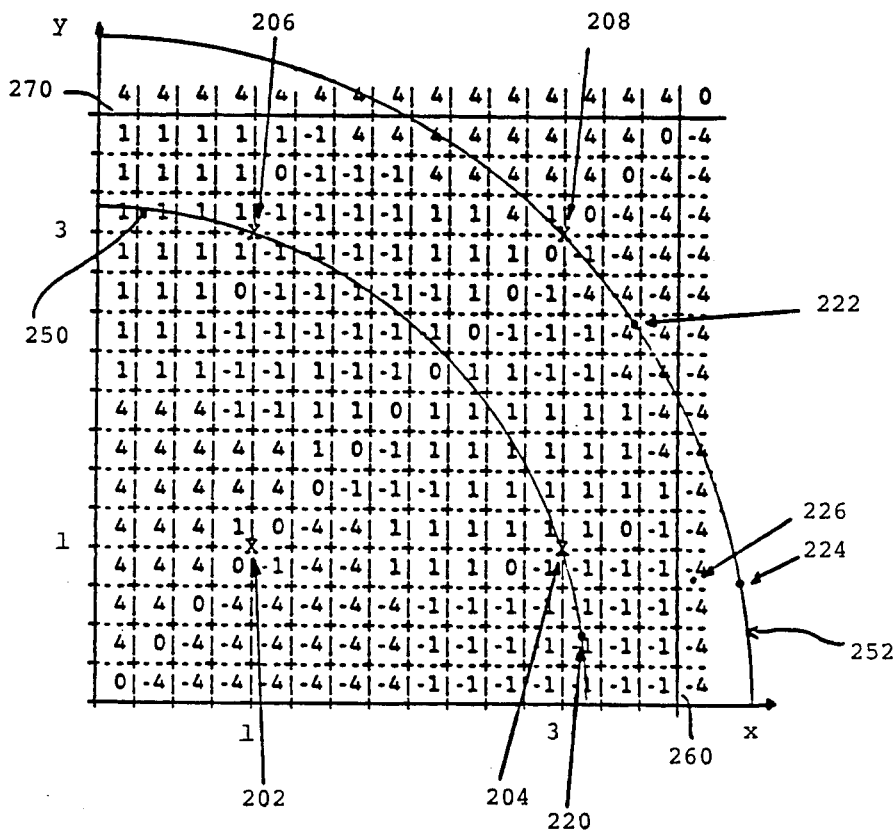
FIG. 13 is a fourth quantization diagram.

FIG. 13 shows the first quadrant of a signal state plane in which the permitted desired signal states are marked by X's 202, 204, 206 and 208. The underlying numerical table is the same as in FIG. 2. The horizontal and vertical lines correspond to the quantization thresholds of the above mentioned A/D-converters 105 and 102. There are 31 quantization thresholds for each axis, only 16 of them being shown because only one quadrant of the state plane is shown. Lines 260 and 270 of FIG. 13 correspond to the maximum quantization thresholds for x' and y', respectively. Point 224, for example, thus yields the same outputs of A/D-converters 105 and 102 as point 226.

If it is supposed that a signal state $(a_k, b_k) = (3,3)$ was transmitted, then corresponding to Equations (9) and (10) and depending on the phase difference $\psi$ and with $A = 1$, the received signal (x,y) may be found anywhere on a circle in the signal state plane with center in the origin of the plane and which goes through the point (3,3). A quarter section 252 of this circle is shown in FIG. 13.

Figure 14A:
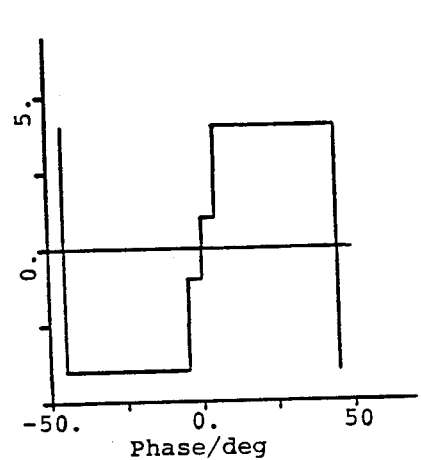
FIGS. 14a, b show two individual phase detector characteristics.

If $\psi = 0$ then (x,y) is (3,3) which is point 208 on section 252. If $\psi$ is less than 0, say $\psi = -10°$, then $(x,y) \approx (3.48, 2.43)$. This state is marked by dot 222 on section 252. The state is thus situated in a quantized region which is determined by the output 11101 of A/D-converter 102 and by the output 11001 of A/D-converter 105. The associated numerical value stored in memory 106 is −4 for this example. FIG. 14a shows a curve in which for each value of $\psi$ on section 252 the stored associated numerical value is given, thereby assuming that the state (3,3) was transmitted. This curve may be interpreted as an "individual phase detector characteristic" for the transmitted state (3,3).

If it is supposed now that signal state $(a_k, b_k) = (3,1)$ was transmitted, then the received signal (x,y) may be found anywhere on a circle in the signal state plane with center in the origin of the plane and which goes through the point (3,1). A quarter section 250 of this circle is shown in FIG. 13 as well.

Figure 14B:
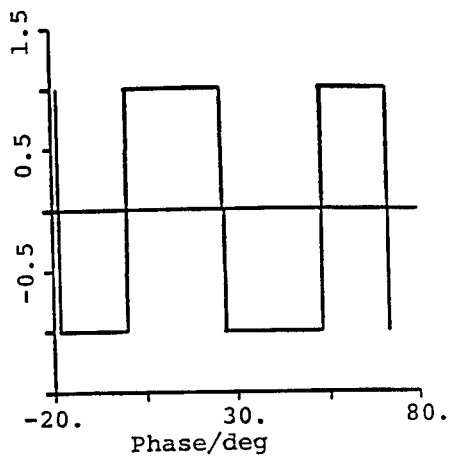
FIG. 14c shows an averaged phase detector characteristic resulting from the fourth quantization diagram of FIG. 13.

If $\psi = 0$ then (x,y) is (3,1) which is point 204 on section 250. If $\psi$ is less than 0, say $\psi = -10°$, then $(x,y) \approx (3.13, 0.46)$. This state is marked by dot 220 on section 250. The associated numerical value stored in memory 106 is −1 for this example. FIG. 14b shows a curve in which for each value of $\psi$ on section 250 the stored associated numerical value is given, thereby assuming that the state (3,1) was transmitted. This curve may be interpreted as an "individual phase detector characteristic" for the transmitted state (3,1).

In just the same manner, individual phase detector characteristic for all permitted signal states (16 in this example) may be found for all possible phase differences $\psi$. The actual control signal for voltage controlled oscillator 10 is formed by averaging these individual characteristics. This is done as follows: for a given value $\psi$ all values of the individual phase detector characteristics are summed up thus resulting in a new numerical value.

Figure 14C:
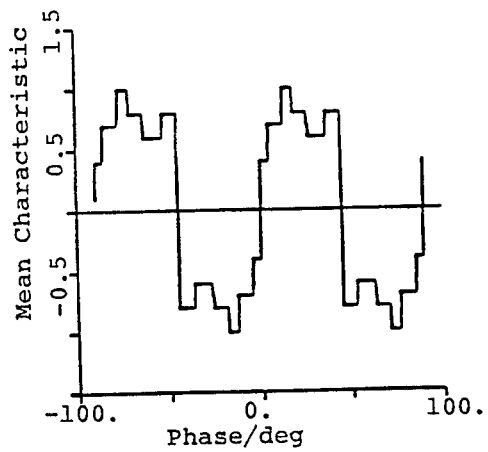

This is done for all values of $\psi$. The result is a new curve. From this curve the maximum absolute value is determined. Then the new curve is devided by this maximum value thus resulting in an averaged curve $g(\psi)$ which is called "mean characteristic". The mean characteristic of the above given example is shown in FIG. 14c for values of $\psi$ ranging from $-90°$ to $+90°$.

The individual phase detector characteristics are dependent on the parameters $\epsilon$ and $\delta$ defined in Equations (12) and (14). They are further dependent on possible interferences of the received signal by noise. Therefore, the mean characteristic depends on $\epsilon$ and $\delta$ as well on the signal-to-noise ratio $\rho$ of the received signal.

Figure 4:
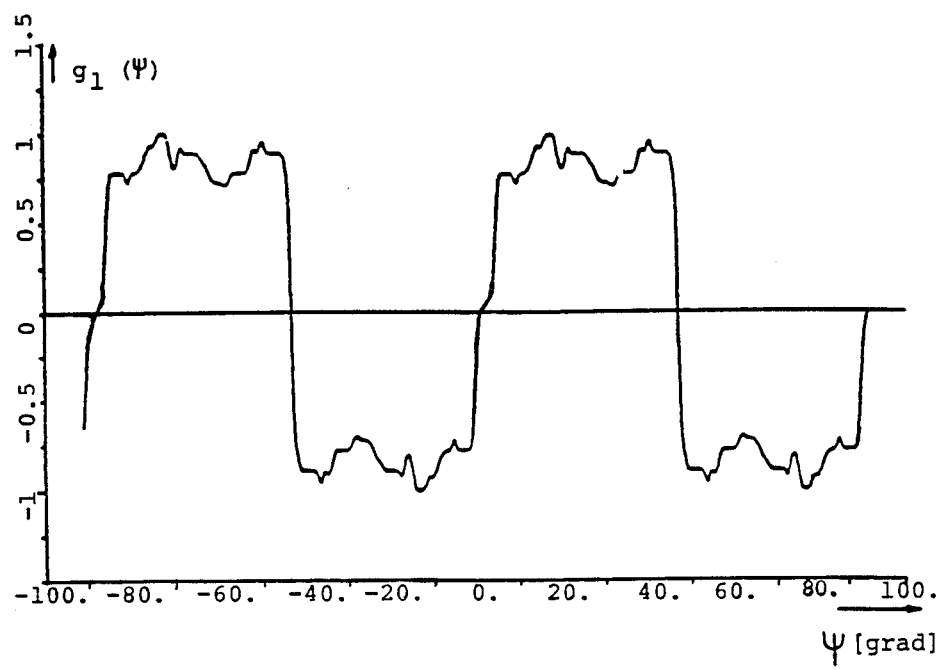
FIG. 4 is the phase detector characteristic resulting from the first quantization diagram (FIG. 2).

If such an averaging of the individual phase detector characteristics is performed with the numerical values derived from FIG. 2, the mean phase detector characteristic $g_1(\psi)$ shown in FIG. 4 results. And averaging of the phase detector function with the numerical values given in FIG. 3 results in the phase detector function $g_2(\psi)$ shown in FIG. 5. The parameters $\epsilon$ $\delta$ and $\sigma$ are here selected as follows: $\epsilon=4°$, $\delta=0°$, $\sigma=40$ dB. These values were selected as examples. In reality, other values may of course occur. It can be seen that the maximum value of the first phase detector characteristic $g_1(\psi)$ is equal to the maximum value of the second phase detector characteristic $g_2(\psi)$ and that the root means square of the first phase detector characteristic $g_1(\psi)$ is greater than that of the second phase detector characteristic $g_2(\psi)$. In other words, on the average, signal $g_1(\psi)$ is higher in energy than signal $g_2(\psi)$; i.e., a control signal $g_1(\psi)$ synchronizes the voltage controlled oscillator faster with the phase of the received signal than a control signal $g_2(\psi)$.

Figure 6:
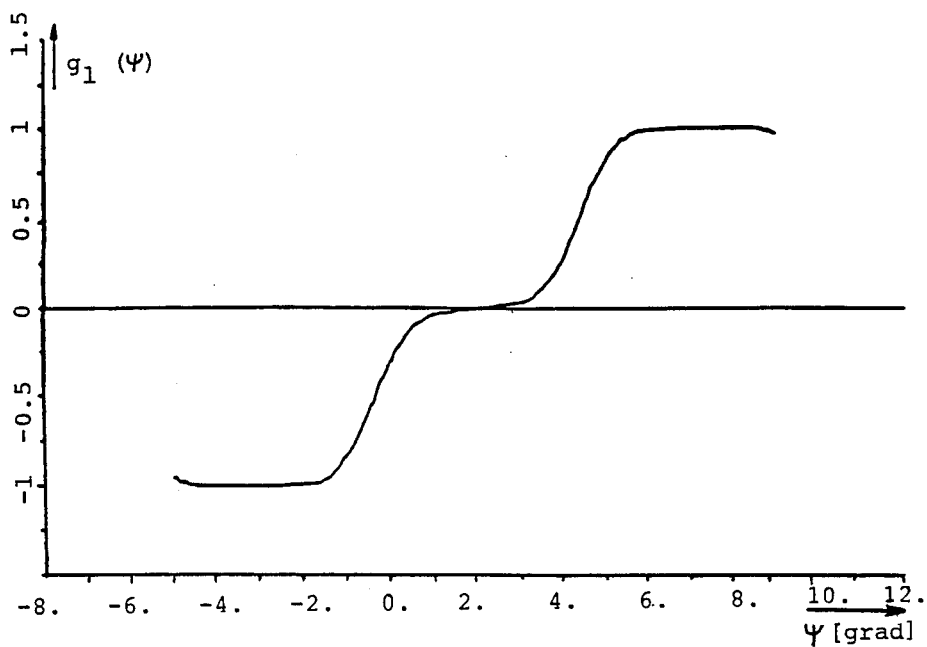
FIG. 6 is an expanded view of a portion of the phase detector characteristic of FIG. 4.
Figure 7:
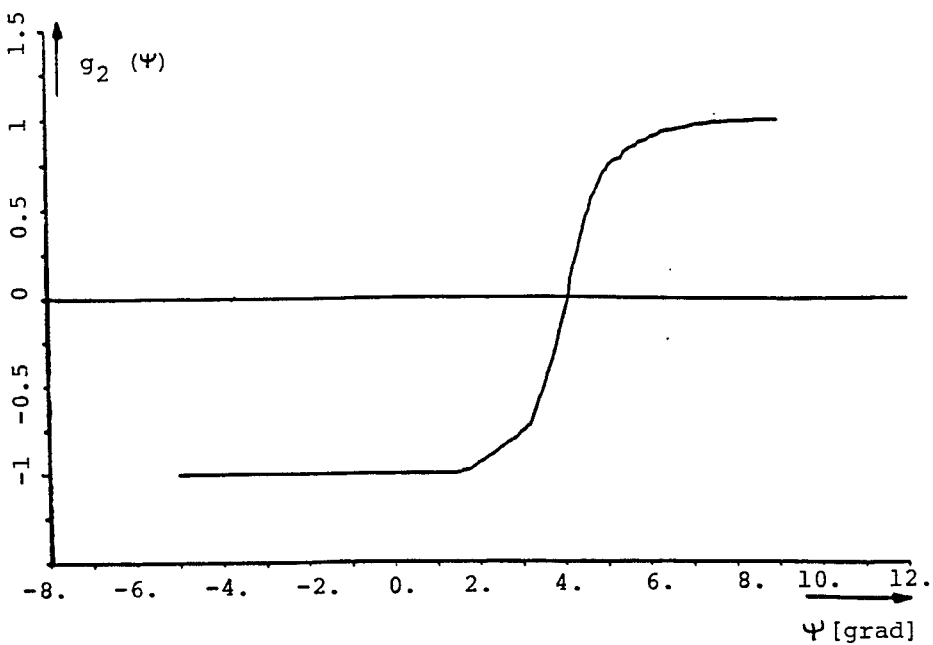
FIG. 7 is an expanded view of a portion of the phase detector characteristic of FIG. 5.

FIG. 6 shows the section around the synchronization point of the first phase detector function $g_1(\psi)$ and FIG. 7 the second around the synchronization point of the second phase detector characteristic $g_2(\psi)$, both in spread form. It can be seen that the first phase detector characteristic $g_1(\psi)$ has a very flat curve where it passes through zero and, moreover, the zero passage takes place at a phase difference $\psi$ which is not equal to the phase deviation $\epsilon$ of the transmitted signal components from their quadrature position. A control loop with such a phase detector characteristic therefore regulates $\psi$ to a value other than $\epsilon$.

This characteristic brings the consequence that, as can be seen in Equations (15) and (16), at $\psi \neq \epsilon$, the QASK receiver does not furnish the desired transmitted signal components $a_k$ and $b_k$, and instead both demodulated signal components x and y contain parts of both transmitted signal components $a_k$ and $b_k$. This error can be avoided by using the second phase detector characteristic $g_2(\psi)$. The phase detector characteristic $g_2(\psi)$ has a steep zero passage precisely at $\psi=\epsilon$. If the condition $\delta=-\epsilon$ is additionally met, the demodulated signal component x is linked only with the transmitted signal component $a_k$ and the demodulated signal component y is linked only with the transmitted signal component $b_k$, as desired.

Figure 5:
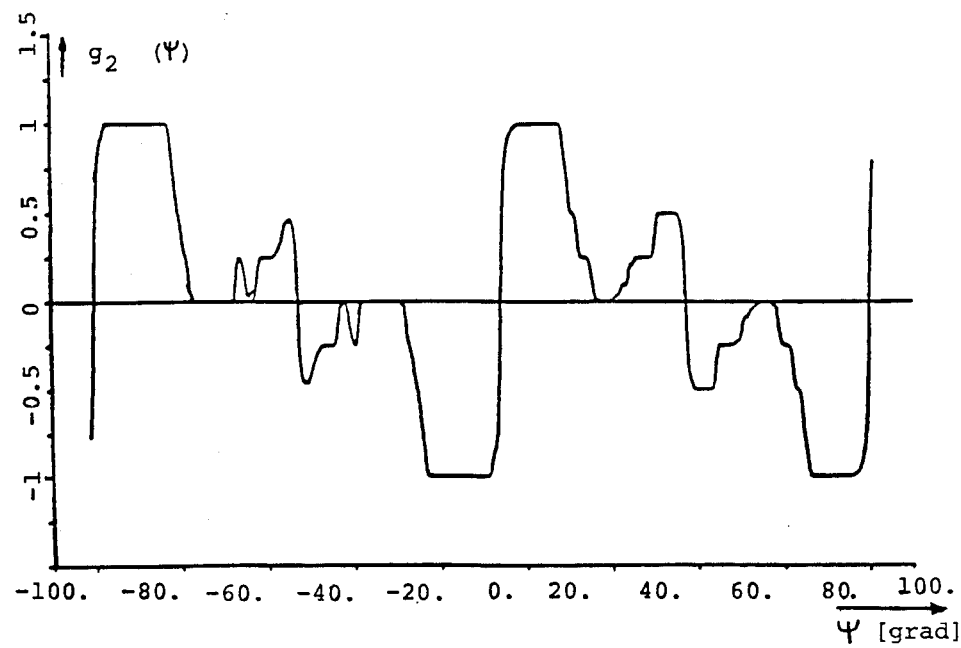
FIG. 5 is the phase detector characteristic resulting from the second quantization diagram (FIG. 3).

The two described phase detector characteristics shown in FIGS. 4 and 6 and in FIGS. 5 and 7, of which each has its own described advantage for carrier generation, are obtained as follows.

The numerical values f(x, y) associated with the quantized regions of all four quadrants of the signal state plane must meet the conditions of Equation (18). And these conditions must be met for both phase detector characteristics.

Additionally, the first phase detector characteristic, which produces faster synchronization, must meet the condition that the following applies for the numerical values f(x, y) of the individual quantized regions (see FIG. 2):

$$f(x, y) = -f(\text{sign}(x)\cdot|y|, \text{sign}(y)\cdot|x|) \tag{19}$$

It enhances the speed of the synchronization if the absolute numerical values are selected to be the highest for those decision regions which result from quantization of received signal components (x,y) originating from permitted signal states that might have been transmitted and have the greatest phase distances from adjacent permitted signal states of the same amplitudes. This is the situation shown in FIG. 2, it being noted that the X shown at (x=1, y=1) has the same amplitude ($r=\sqrt{2}$) as permitted signal states at (x=-1, y=1) and (x=1, y=-1) in the second and fourth quadrants (not illustrated in FIG. 2) and is separated from each of these adjacent permitted signal states by phase distance of 90°. It will be apparent that the X illustrated in FIG. 2 at (x=3, y=3) also has a phase distance of 90° from adjacent permitted signal states (in the second and fourth quadrants) having the same amplitude.

For the second phase detector characteristic (which has the more favorable zero passage) it is necessary, in addition to meeting Equation (18), that in the close vicinity of signal states the numerical values of adjacent quantized regions which lie next to one another in the direction of one of the two coordinate axes have opposite signs, and the numerical values of quantized regions which lie next to one another in the direction of the other coordinate axis must have the same sign (see FIG. 3).

Figure 9:
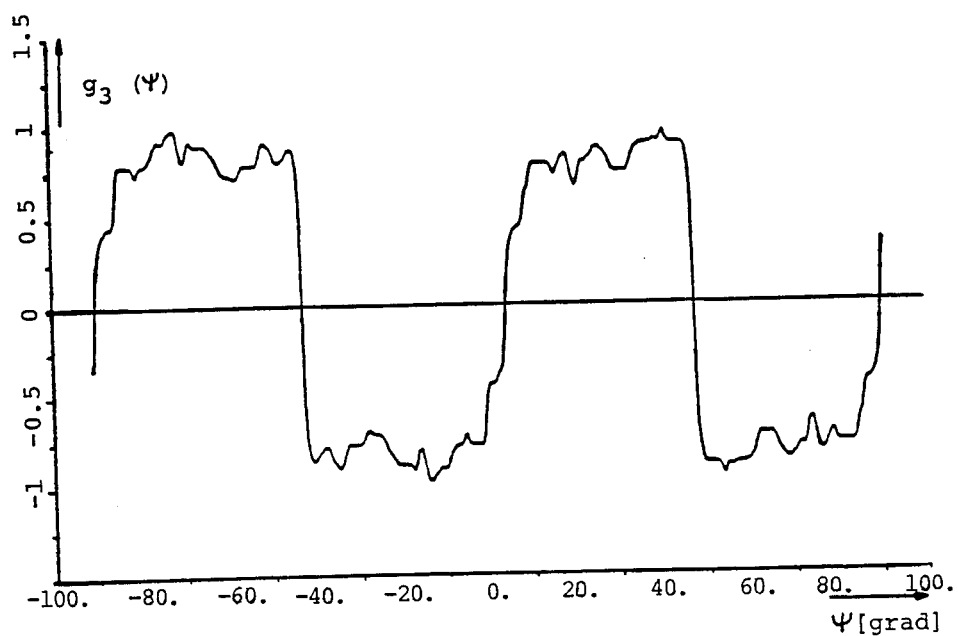
FIG. 9 is a phase detector characteristic resulting from the third quantization diagram (FIG. 8).
Figure 10:
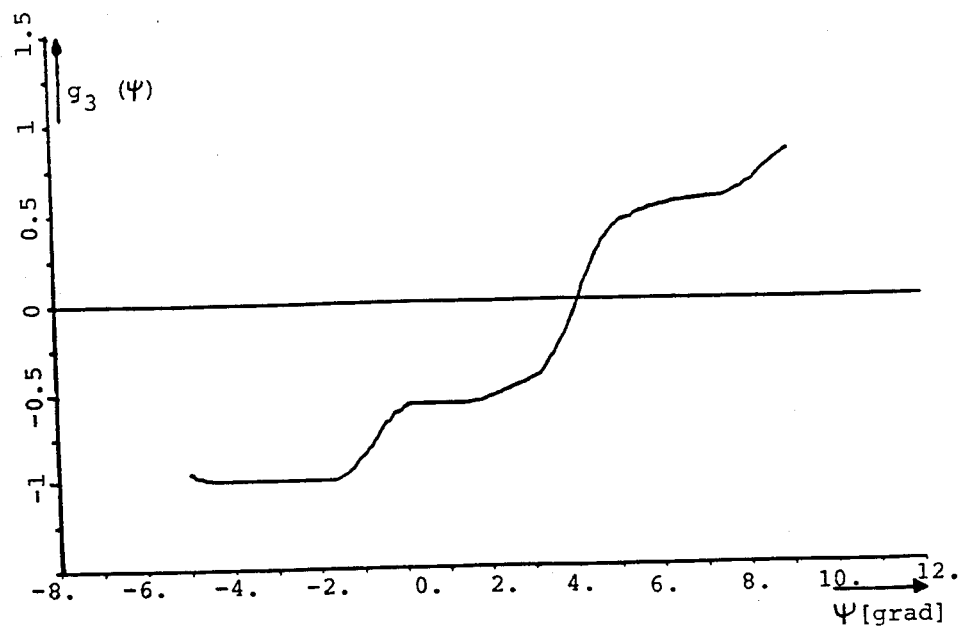
FIG. 10 is an expanded view of a portion of the phase detector characteristic of FIG. 9.

To now combine the advantages of both phase detector characteristics, a new, third, phase detector characteristic is formed which is shown in FIG. 9 (and in a spread view in FIG. 10). This phase detector characteristic is produced in that, as shown in FIG. 8, for the quantized regions of the signal state plane in the close vicinity (see the outlined regions in FIGS. 3 and 8) of the permitted signal states, the numerical values of that signal state plane (see FIG. 3) are taken over which have the phase detector characteristic that has the more favorable zero passage. For all other decision regions, the numerical values of the other signal state plane (see FIG. 2) are taken over.

As has previously been described, each of the quantized regions of the signal state planes is associated with a respective memory location in a memory in which the numerical value belonging to the respective quantized region is stored. Most advisably, the procedure is such that initially a first memory MEM1 (301 in FIG. 15) is filled with the numerical values which result in a phase detector characteristic that produces faster synchronization, and a second memory MEM2 (302 in FIG. 15) is filled with the numerical values which result in the phase detector characteristic having the favorable zero passage. Then the numerical values from the quantized regions in the vicinity of desired signal states are transferred from the second memory into corresponding memory locations of a third memory MEM3 (303 in FIG. 15) and the remaining memory cells of this third memory are filled with the numerical values from the first memory MEM1.

Figure 15:
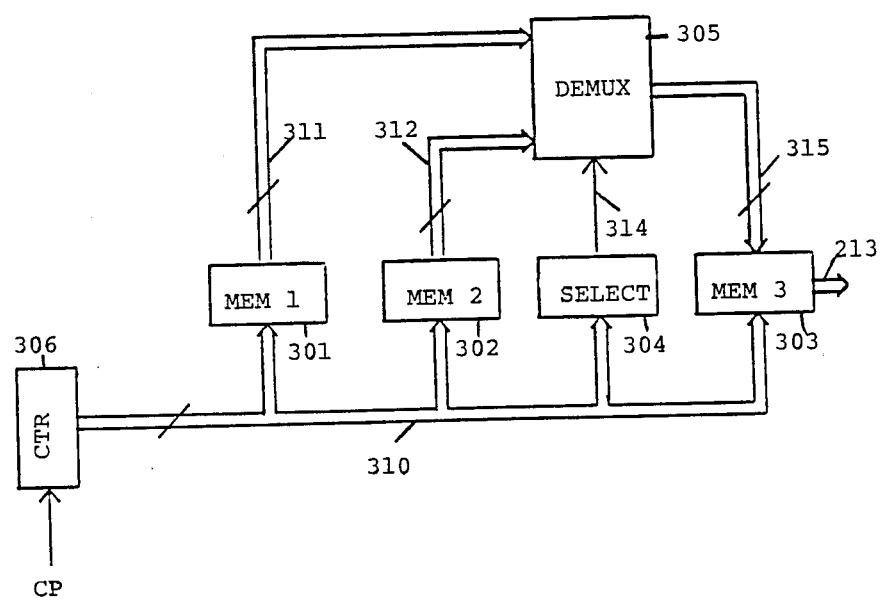
FIG. 15 is a block circuit diagram for transferring and combining the information stored in two different memories into a third memory.

FIG. 15 shows a block circuit diagram for this procedure. In addition to memories 301, 302 and 303, an address counter 306, a demultiplexer 305 and a logical selection circuit 304 are shown. Address counter 306 produces an n-bit digital signal on address bus 310 such that all possible memory cell locations of memories 301, 302 and 303 may be addressed. Thus, if $2^{10}$ memory cells are to be addressed, address counter 306 must produce a 10-bit word. Address bus 310 is fed to the address inputs of memories 301, 302 and 303 as well as to the input of logical selection circuit 304. If a particular address word is produced on bus 310, then the numerical value stored in the memory cells of memories 301 and 302 corresponding to this address are read out via data busses 311 and 312 and the data on data bus 315 are written into the memory cell addressed by this address in memory 303. Data busses 311 and 312 are fed to demultiplexer 305 who transfers either the information on bus 311 or the information on bus 312 to data bus 315. Which of these bus information are transferred depends on the signal state of control line 314. If the signal on line 314 is logically 1 then the information on bus 312 is transferred. Otherwise, the information on bus 311 is transferred. The transferred data are fed via bus 315 to the data input of memory 303 and then written into the memory cell which corresponds to the memory cell where they stem from.

Figure 16:
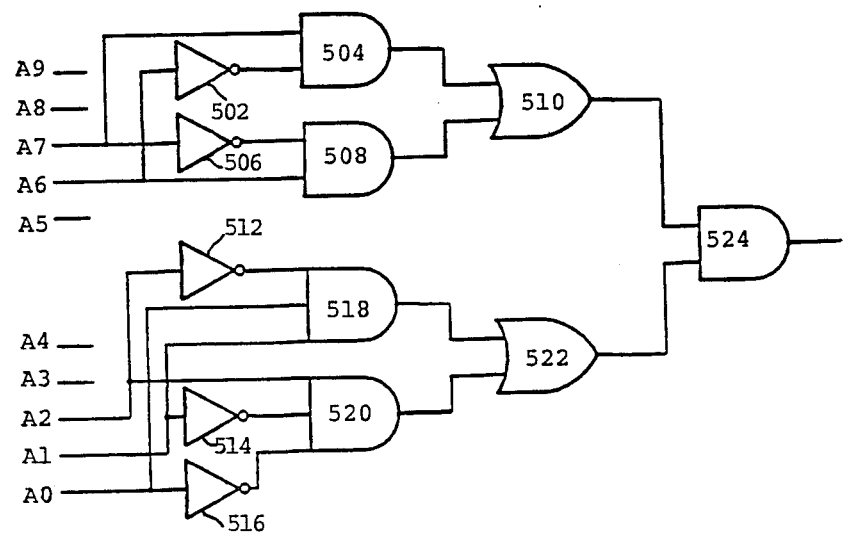
FIG. 16 is a logical selection circuit.

FIG. 16 shows an example for a logical selection circuit corresponding to the example given with FIGS. 2, 3 and 8. It consists of five inverters 502, 506, 512, 514 and 516, three two-input AND gates 504, 508 and 524, two three-input AND gates 518 and 520 and two OR gates 510 and 522. The circuit has 10 inputs $A_0$ to $A_9$ which together form an address bus. This bus corresponds to address bus 310 of FIG. 15.

Only five of the 10 inputs are used. Input $A_0$ is fed to the second input of AND gate 518 and via inverter 516 to the third input of AND gate 520. Input $A_1$ is fed to the third input of AND gate 518 and via inverter 514 to the second input of AND gate 520. Input $A_2$ is fed to the first input of AND gate 520 and via inverter 512 to the first input of AND gate 518. The output of AND gate 518 is thus logically 1 if $A_2A_1A_0$ is 011. And the output of AND gate 520 is logically 1 if $A_2A_1A_0$ is 100. The outputs of gates 518 and 520 are fed to the two inputs of OR gate 522 the output of which thus is logically 1 if $A_2A_1A_0$ is 011 or 100.

Input $A_6$ is fed to the second input of AND gate 508 and via inverter 502 to the second input of AND gate 504. Input $A_7$ is connected to the first input of AND gate 504 and via inverter 506 to the first input of AND gate 508. The output of gate 504 is thus logically 1 if $A_7A_6$ is 10 and the output of gate 508 is logically 1 if $A_7A_6$ is 01. The outputs of gates 504 and 508 are connected to OR gate 510 which produces at its output a signal which is logically 1 if $A_7A_6$ is 01 or 10.

The outputs of gates 510 and 522 are fed to the two inputs of gate 524. Thus, the output of gate 524 which is the output of the circuit 304 of FIG. 15, is logically 1 if $A_7A_6$ is 01 or 10 and if at the same time $A_2A_1A_0$ is 011 or 100.

Figure 17A:
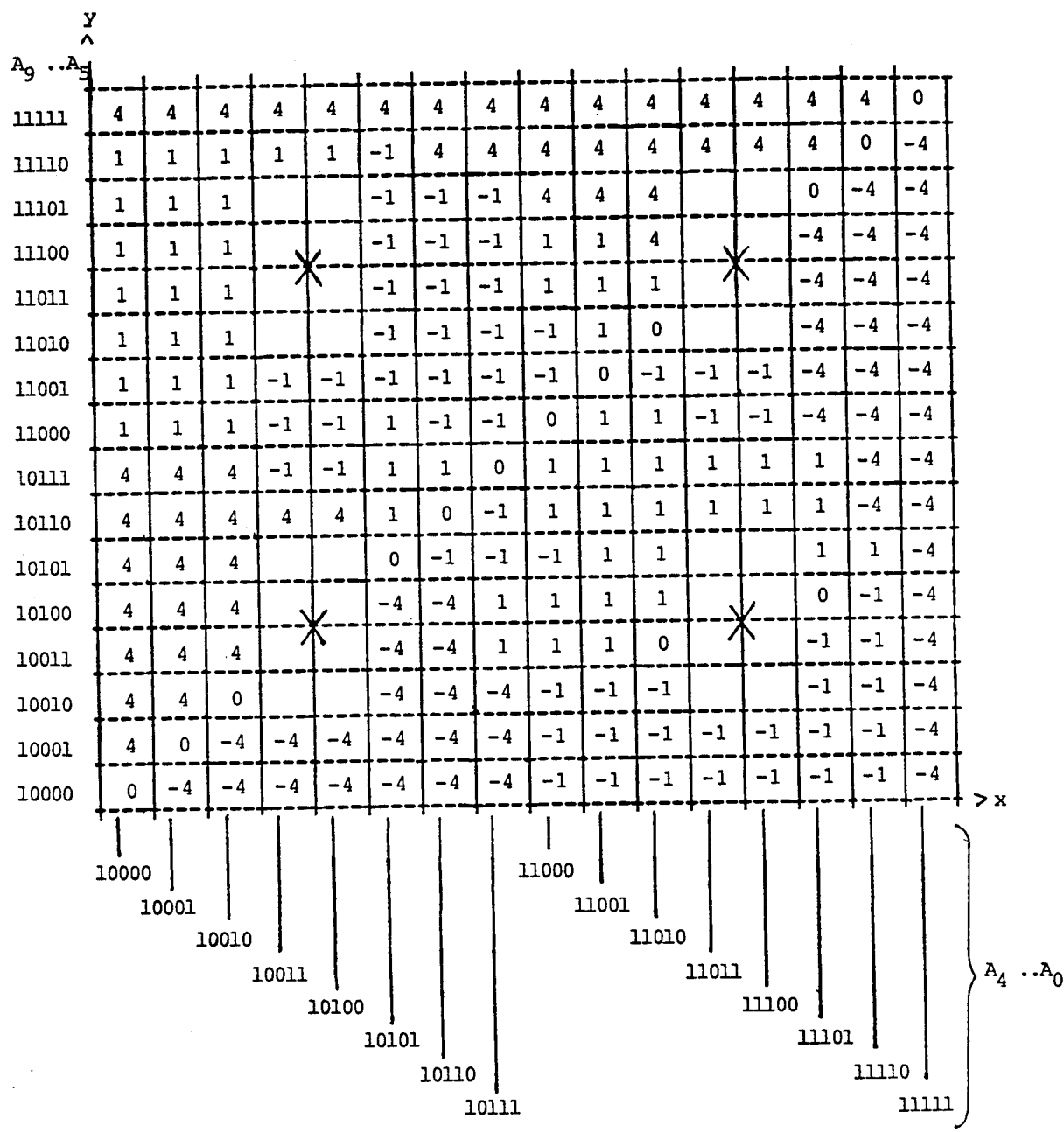
FIGS. 17a, b, c show the combination of two phase detector tables, as shown in FIGS. 17a and 17b, to result in a third table, as shown in FIG. 17c.
Figure 17B:
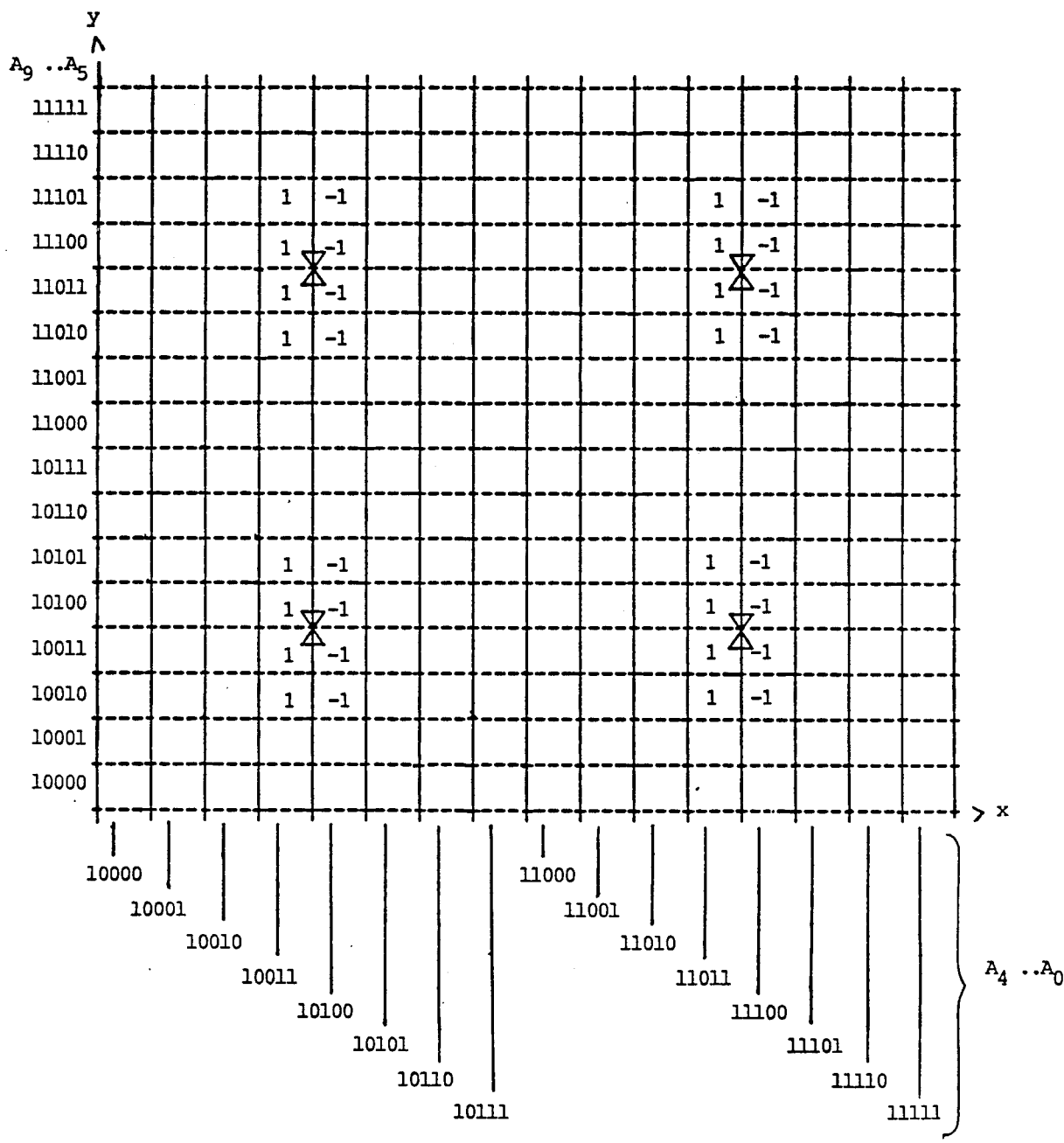
Figure 17C:
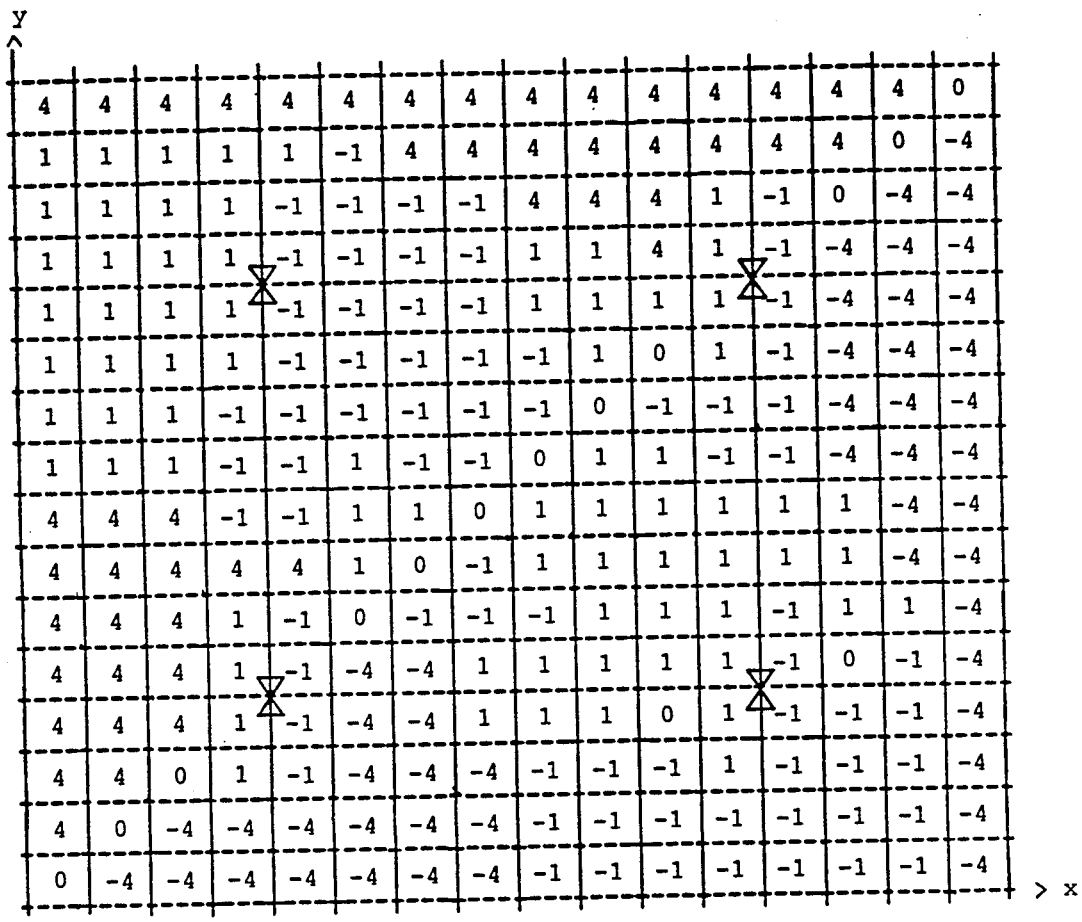

To clarify the situation, FIGS. 17a–17c are provided. Here the numerical values of memories 301 and 302 are again shown in FIGS. 17a and 17b for the first quadrant of the state plane. In contrast to the tables of FIGS. 2 and 3, only the numerical information of those memory cells is represented which are to be transferred to third memory 303. FIG. 17c shows the superposition of the tables in FIGS. 17a and 17b thus resulting in the same table as in FIG. 8. The x-position of a memory cell in these tables may be expressed by a five-bit word $A_4A_3A_2A_1A_0$ where $A_0$ is the least significant bit. The x-positions of the marked cells in the table of FIG. 17b are thus expressed as 10011, 10100, 11011 and 11101. (In a complete table representing all four quadrants of the state plane, words 00011, 00100, 01011 and 01101 had to be added). The x-position of these cells is thus described by the bit combination $A_2A_1A_0=011$ or $A_2A_1A_0=100$. The y-position of a memory cell in the table may also be expressed by a five-bit word: $A_9A_8A_7A_6A_5$ where $A_5$ is the least significant bit. The y-positions of the marked cells in the table are 10010, 10011, 10100, 10101, 11010, 11011, 11100 and 11101. (In a complete table representing all four quadrants of the state plane, words 00010, 00011, 00100, 00101, 01010, 01011, 01100 and 01101 had to be added). The y-position of these cells is thus described by the bit combination $A_7A_6=01$ or $A_7A_6=10$. If a memory cell is described by $A_2A_1A_0=100$ or 011 and if at the same time of the cell is described by $A_7A_6=10$ or by 01, then exactly one of the marked cells of FIG. 17b (including the corresponding cells of the three other quadrants) is addressed. This shows that the output of the circuit 304 of FIG. 15 is logically 1 if one of these marked cells is addressed and it is logically 0 otherwise.

Figure 11:
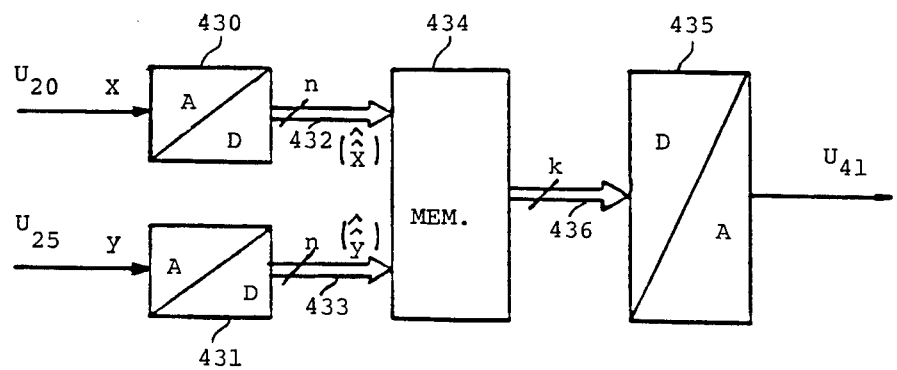
FIG. 11 is a block diagram for the determination of a phase control signal.

FIG. 11 shows a block diagram for a portion of a baseband detector (40 in FIG. 1) which includes a memory 434 corresponding to the above-mentioned third memory. Signal components $u_{20}$ and $u_{25}$ (see FIG. 1) are translated to provide non-negative signals (although this is not shown in FIG. 12), and are then quantized and coded by means of two analog/digital converters 430 and 431 so that n-bit words and are present at their outputs 432 and 433. The thresholds of analog/digital converters 430 and 431 correspond to quantization thresholds which define the quantized regions in the signal state plane as has previously been discussed. Both n-bit words and together represent that address in memory 434 at which the k-bit coded numerical value is present for that quantized region to which belongs the signal state having signal components x and y. The k-bit coded numerical value is read out of memory 434 and fed via a bus 436 to a digital/analog converter 435 which forms from it the analog numerical value, i.e. the phase detector function $u_{41}$. As described above, averaging of phase detector function $u_{41}$ over several signal states produces a control signal $u_{50}$ for voltage controlled oscillator 10. The averaging is done in control filter 50.

One advantage of the circuit shown in FIG. 11 is that the phase detector characteristic, which is determined by the content of the memory, can easily be modified by exchanging memory 434 or its contents.

The present disclosure relates to the subject matter disclosed in European application EP 88 100 983.1 of Jan. 23rd, 1988, the entire disclosure of which is incorporated herein by reference.

It will be understood that the above description of the present invention is susceptible to various modifications, changes, and adaptations, and the same are intended to be comprehended within the meaning and range of equivalents of the appended claims.

What I claim is:

1. A method for recovering a control signal to control the phase of a local carrier signal in such a manner that the local carrier signal and the carrier signal of an amplitude and/or phase shift keyed received signal are synchronous in phase, comprising:

(a) dividing the local carrier signal into two at least approximately orthogonally oriented local carrier components which represent the coordinate axes of a signal state plane having four quadrants;

(b) mixing the received signal with the two local carrier signal components to produce two mixed signal components which represent projections of received signal states on the coordinate axes of the signal state plane;

(c) using the two mixed signal components to address a memory having a plurality of memory locations in order to read out the content of a memory location for each received signal state, the memory locations in the memory corresponding to quantized regions into which the signal state plane is divided by way of quantization thresholds extending parallel to the two coordinate axes, predetermined ones of the quantization thresholds intersecting at predetermined points which correspond to permitted signal states that migh have been transmitted wherein each memory location stores a respective numerical value f(x, y) which is representative of a phase deviation between a quantized region corresponding to the respective memory location and the closest predetermined point, where x and y represent position coordinates of the quantized region corresponding to the respective memory location in the signal state plane, wherein the numerical values stored in the memory are selected so that $f(-x, y) = -f(x, y)$ and $f(x, -y) = -f(x, y)$ for all four quadrants of the signal state plane, wherein the numerical values stored in memory locations corresponding to quantized regions closely adjacent to the predetermined points are selected so that the numerical values for quantized regions lying next to one another in the direction of one of the two coordinate axes have opposite signs and the numerical values for quantized regions lying next to one another in the direction of the other coordinate axis have the same sign, and wherein the numerical values stored in memory locations corresponding to quantized regions which are not closely adjacent to the predetermined points are selected so that $f(x, y) = -f(\text{sign}(y) \cdot |y|, \sin(y) \cdot |x|)$ for each quadrant of the signal state plane; and (d) averaging numerical values read out of the memory for a plurality of received signal states to produce the control signal.

2. The method of claim 1, further comprising the step of storing the numerical values in the memory of step (c), the step of storing comprising:

writing into memory locations of another memory numerical values f(x, y) for the quantized regions of the entire signal state plane, the numerical values written into the another memory meeting the conditions $f(-x, y) = -f(x, y)$, $f(x, -y) = -f(x, y)$, and $f(x, y) = -f(\text{sign}(x) \cdot |y|, \text{sign}(y) \cdot |x|)$;

writing into the memory locations of a further memory numerical values for the quantized regions of the entire signal state plane, the numerical values written into the further memory meeting the conditions $f(-x, y) = -f(x, y)$ and $f(x, -y) = -f(x, y)$, the numerical values written into the further memory additionally meeting the condition that numerical values for quantized regions lying next to one another in the direction of one of the two coordinate axes have opposite signs and the numerical values of quantized regions lying next to one another in the direction of the other coordinate axis have the same sign; and storing in the memory of step (c) values written into the another memory and the further memory, the memory locations of the memory of step (c) which correspond to quantized regions closely adjacent the predetermined points receiving numerical values from corresponding memory locations of the further memory and the remaining memory locations of the memory of step (c) receiving numerical values from corresponding memory locations of the another memory.

3. The method of claim 1, wherein the permitted signal states that might have been transmitted have amplitudes and phase positions, wherein the numerical values stored in the memory locations do not all have the same absolute value, and wherein the numerical values having the largest absolute values are stored in memory locations corresponding to quantized regions resetting from quantization of received signal (components (x,y) or originating from permitted signal states that have the greatest phase distance from adjacent permitted signal states of the same amplitude.

4. The method of claim 1, wherein step (c) is conducted by quantizing and coding the two mixed signal components in parallel in analog-to-digital converters to provide two coded signal components, and by addressing the memory with the two coded signal components, and wherein the method of claim 1 further comprises using a digital-to-analog converter to convert the numerical value stored in the addressed memory location to an analog signal after the respective numerical value is read out of the memory.

* * * * *